Oct. 16, 1934.  C. BIRDSEYE  1,977,373
FREEZING AND PACKAGING FOOD PRODUCTS
Filed April 6, 1932
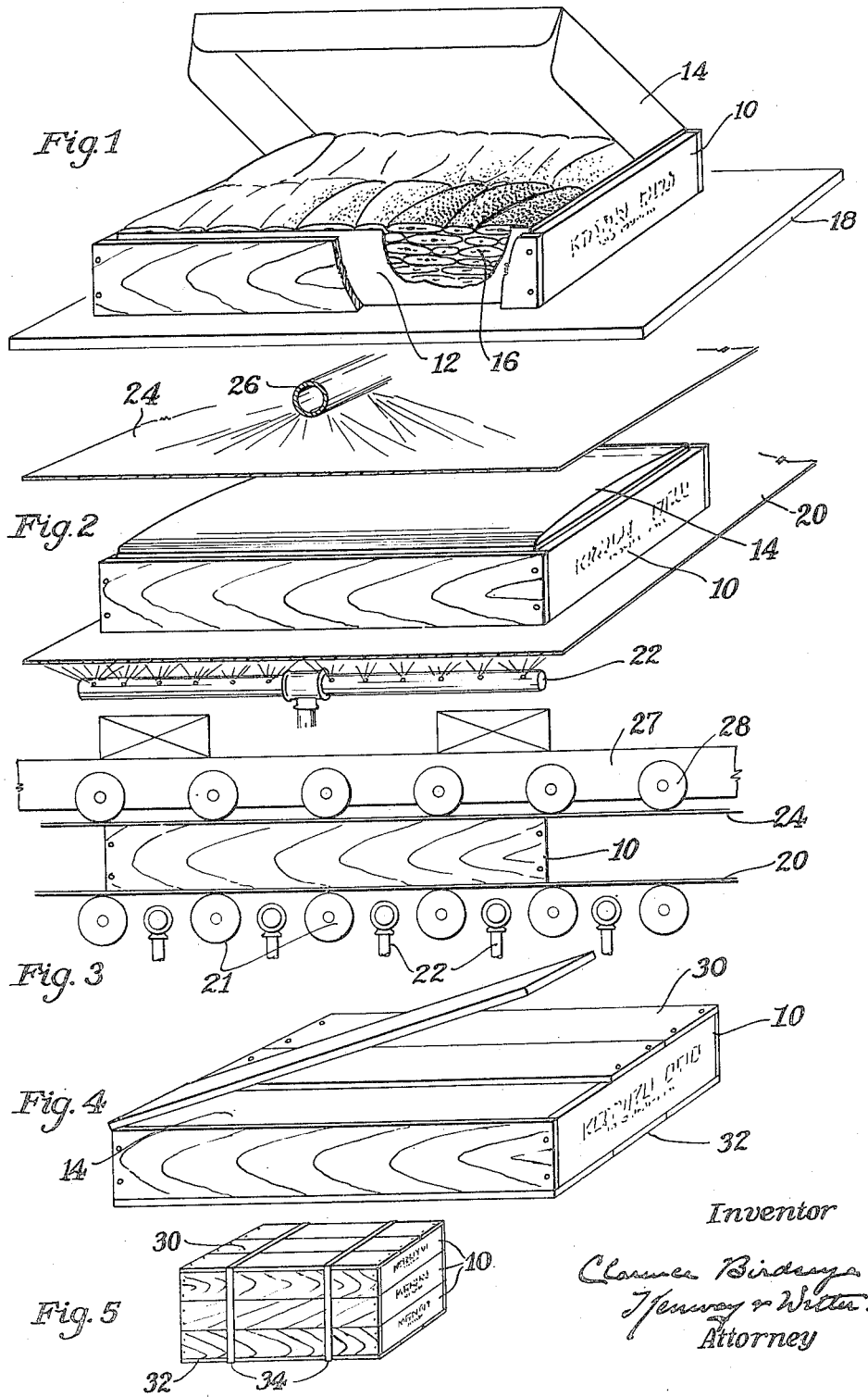

Patented Oct. 16, 1934

1,977,373

UNITED STATES PATENT OFFICE 1,977,373

FREEZING AND PACKAGING FOOD PRODUCTS

Clarence Birdseye, Gloucester, Mass., assignor to Frosted Foods Company, Inc., Dover, Del., a corporation of Delaware Application April 6, 1932, Serial No. 603,571

7 Claims. (Cl. 62—170)

This invention relates to methods of preparing consumer packages of perishable food products, and more particularly to such methods as are characterized by a freezing step.

My invention is concerned with the important and difficult problems of packaging in unit quantities fresh perishable food products such, for example, as fish, meat, fruit or vegetables, and in accomplishing this without impairing the fresh characteristics of the product, protecting it against desiccation and deterioration from both internal and external sources, and adapting it to be transported, stored and distributed to the consumer in condition for immediate use.

My invention may be practiced most advantageously when it includes as one characteristic step the quick-freezing of the product. This process, as will be understood, preserves fresh food substances in general, and notably fresh fish or meat, in substantially its fresh condition without deterioration in the mechanical construction of its tissue and at the same time substantially lessens autolysis, putrefaction and oxidation, preserving the vitamin content and eliminating loss of savory and nutritive constituents when the product is thawed. In one aspect, my invention consists in preparing a consumer package of quick frozen product in such a manner as to insure the results above discussed and at the same time facilitate the quick-freezing step.

In carrying out my invention, I propose to pack or form the product into a block or cake of convenient size, confining its marginal edges within an open frame to maintain the shape thereof while exposing the opposite faces of the product so that they may be engaged and the product frozen while so confined. Freezing, and particularly quick-freezing, is carried out effectively when the product is firmly engaged by heat-conductive members over a substantial area upon opposite sides. The method of my invention facilitates freezing in this manner in that the frame which I propose to use extends only about the marginal edges of the block or cake of product, leaving its opposite faces exposed so that they may be engaged by heat-conductive members independently of the frame.

The method of my invention has the further advantage that the frame which is utilized to confine the packed product may also be employed after the freezing step as a portion of the packing or container in which the frozen product is enclosed. For example, by employing a wooden frame of proper width to confine the product during the packing and freezing steps, the side walls of the ultimate package are already supplied and the package may be completed by attaching top and bottom members to the frame while the frozen product remains undisturbed within it.

The method of my invention may furthermore be practiced under conditions where it is desired to enclose the product to be frozen in a carton or within a flexible lining material which is not in itself sufficiently rigid to contain the product without distortion. This phase of the problem is encountered in packaging fresh fish and the like in cartons of substantial size. A pasteboard carton of sufficient size to contain twelve or fifteen pounds of moisture-containing fresh fish fillets is usually not sufficiently rigid to maintain its shape without distortion while being packed, and before being frozen is difficult to handle without liability to damage. In applying the method of my invention to packages of this character, it is proposed to enclose the carton within an open frame which embraces only its marginal walls and provides a rigid backing whereby the carton may be completely packed with the moisture-containing product without being bulged or misshapen. The carton may then be frozen between heat-conductive members which directly engage the upper and lower faces of the carton. After the freezing operation, the package may, if desired, be completed by securing top and bottom members to the frame so that the packed and frozen carton is entirely enclosed therein and may be shipped at once for distribution to the consumer or safely and economically stored, and if wood or fibre is employed in the construction of the frame the package is protected against heat loss in a large measure on account of the insulating qualities of its enclosure.

My invention presents the further advantage of facilitating shipment of frozen products from storage in marketable packages of the size desired by purchaser. By this I mean that two or more of the frame-enclosed units may be assembled, strapped together and supplied with top and bottom covers, thus forming a multiple unit package.

These and other features of the invention will be best understood and appreciated from the following description of a preferred procedure in putting it into practice, selected for purposes of illustration and shown in the accompanying drawing, in which Fig. 1 is a view in perspective of a packed carton enclosed within a supporting frame;

Fig. 2 is a view in perspective of the closed supported carton in readiness to be introduced between the heat-conductive members of a refrigerating apparatus;

Fig. 3 is a view in side elevation showing the packed carton in position for quick-freezing in the same apparatus;

Fig. 4 is a view in perspective illustrative of the step of converting the frame into a complete container; and Fig. 5 is a view in perspective, on a reduced scale, of a multiple unit package.

As already stated, an important field of use of the present invention is in the freezing and packaging of fresh fish fillets, and for purposes of illustration the method of my invention is herein disclosed as being carried out in that connection.

The fillets as packed are confined within a shallow rectangular frame 10, comprising side and end pieces secured together so as to form a rigid structure, entirely open and unobstructed at its upper and lower sides. The material of the frame may be wood or fibre possessing the requisite strength and having heat-insulating properties. The frame 10 herein shown is of wood and is made up of side pieces nailed to somewhat thicker end pieces.

As herein shown, the fish fillets 16 are individually wrapped and packed within a carton 12 which exactly fits within the frame 10 and serves as a lining for the frame and a protection for the product. The carton may be advantageously made of sheet material which is waxed or otherwise treated to render it substantially moisture-proof. For product liable to appreciable leakage before freezing or after thawing, cartons with water-tight edges and corners may be employed. The carton may be somewhat thicker than the frame 10 and is provided with a cover 14. In Fig. 1, the carton 12, reinforced by the frame 10, is represented as placed upon a supporting plate or table 18 and as being packed full of fresh fillets 16. Preferably and as herein shown, the mass of the product extends slightly above the top of the frame but only by an amount which may be removed by compression in the subsequent steps of the method.

Having packed the reinforced carton as shown in Fig. 1, the cover 14 is closed upon the product, the flap being tucked down within the sides of the frame 10. The carton is then ready for the freezing step and, to this end, may be presented to refrigerating apparatus of any commercial type employing oppositely disposed heat-conductive members. In Fig. 2, oppositely arranged belts 20 and 24 represent the heat-conductive members of such apparatus as that disclosed in my prior Patent No. 1,822,077, September 8, 1931. In such apparatus, the lower belt 20 is supported for movement in a fixed path by rollers 21 and is refrigerated by brine supplied to its under surface from a series of spray pipes 22. The upper belt 24 is refrigerated by a spray pipe 26 and is moved into engagement with the interposed product by a weighted frame 27 supported by rollers 28 upon the belt 24. As shown in Fig. 2, the packed and frame-contained carton 12 is placed upon the lower belt 20 in position to be carried into the refrigerating apparatus, where it is engaged and compressed between the two refrigerated belts, as shown in Fig. 3. In this operation, it will be observed that the contents of the carton and the carton itself may be compressed flush with the frame 10. The voids and interstices between the fillets are thus minimized and the product solidified and held under a predetermined amount of pressure during the freezing step. It will be observed also that the carton is engaged with uniform pressure throughout its entire upper and lower faces by the heat-conductive belts 20 and 24 and thus is created a favorable condition for rapid heat interchange and quick-freezing of the product.

The belts 20 and 24 are advanced slowly through the freezing zone with the frame-contained carton between them, and this emerges at the delivery end of the apparatus with the product completely frozen within the frame. The expansion of the product in freezing tends to close the voids therein and also to cause it to fill the frame completely and engage it with pressure so that there is little tendency for the frozen filled carton to slip out of the frame when removed from the refrigerating apparatus.

The final step in the preferred method of my invention consists in completing the marketable package which has already partially been formed by the frame 10. This may be done, as indicated in Fig. 4, by securing a top 30 and a bottom 32 to the frame 10, as by nailing them directly to the sides of the frame. This may be effected conveniently since the contents of the frame has been accurately shaped and solidified with its opposite faces substantially flush with the edges of the frame. The package thus completed is well adapted for storage or shipment in distribution to the consumer and may be handled under cold storage conditions as an imperishable food product.

It is essential that the minimum amount of insulating material be interposed between the product and the heat-conductive members by which it is to be frozen, and for this reason it is highly undesirable to attempt to quick-freeze through top and bottom members of packages sufficiently heavy to stand shipment.

While I have herein suggested the use of a carton within the supporting frame 10, it will be understood that any form of lining material may be substituted therefor or that a lining may be omitted in cases where the product does not require this refinement.

The frozen frame-supported units may be completed singly as marketable packages, as suggested in Fig. 4, or may be assembled in two or more units and then completed when it is desired to ship larger packages. In Fig. 5 is shown a marketable package comprising three units, assembled with the walls of their frames 10 in registration, provided with one set of top and bottom covers 30 and 32 and bound together by straps 34 of strip metal or the like.

Having thus described by invention, what I claim as new and desire to secure by Letters Patent is:

1. The method of freezing and packaging food products, characterized by the steps of supporting a carton upon a plane surface and reinforcing its marginal walls by enclosing the carton within an open frame, packing the carton while so supported and reinforced, engaging the packed carton upon its exposed faces, and freezing the product therein from said faces.

2. The method of freezing and packaging food products, which consists in reinforcing and supporting a carton by enclosing its peripheral walls within a rigid open frame, packing the supported carton with food product to a level above the top of the frame, compressing the contents of the packed and reinforced carton by engaging the exposed faces of the carton between heat-conductive members, freezing the product while so compressed, and then forming a marketable package by securing top and bottom members to the frame.

3. The method of freezing and packaging food products, which consists in binding the peripheral walls of a carton within an open frame, packing the carton while so bound with a food product to a level above the frame, compressing the contents of the carton by pressure applied to its upper and lower faces and simultaneously freezing the same, and subsequently securing top and bottom members to the frame thereby packaging the frozen product.

4. The method of freezing and packaging food products, characterized by the steps of shaping the product into a block of convenient size, enclosing the same within a substantially moisture-proof wrapping, confining the wrapped block within an open shallow frame which exposes its opposite faces, and then compressing the wrapped block while confined within the frame and freezing it while so compressed.

5. The method of freezing and packaging food products, characterized by the steps of shaping the product into a rectangular mass, enclosing the same within a substantially moisture-proof wrapping, confining the wrapped mass within an open frame which exposes its upper and lower faces, and then engaging the exposed faces of the wrapped mass with heat-conductive surfaces while confined within the frame, and freezing it while so engaged.

6. The method of freezing and packaging, characterized by the steps of packing a fresh, moisture-containing food product within an open frame in a mass exceeding the height of the frame, compressing the mass till it is substantially flush with the edges of the frame thereby forcing the mass against the sides of the frame, then freezing the product while so compressed, and finally closing the open sides of the frame to form a marketable package.

7. The method of freezing and packaging food products, which consists in supporting the peripheral walls of a plurality of cartons within rigid open frames, packing the supported cartons with a moisture-containing food product to the level of their respective frames, compressing and freezing the product within the frames, stacking the frames with their frozen contents, and securing them together between one set of covers.

CLARENCE BIRDSEYE.